(12) United States Patent
Armstrong

(10) Patent No.: US 12,048,360 B2
(45) Date of Patent: Jul. 30, 2024

(54) COMPOSITE PROTECTIVE CASE FOR PHONES, OTHER PORTABLE ELECTRONIC DEVICES AND OTHER APPARATUS

(71) Applicant: Urban Armor Gear, LLC, Laguna Niguel, CA (US)

(72) Inventor: Steven Armstrong, Laguna Niguel, CA (US)

(73) Assignee: URBAN ARMOR GEAR, LLC, Laguna Niguel, CA (US)

( * ) Notice: Subject to any disclaimer, the term of this patent is extended or adjusted under 35 U.S.C. 154(b) by 0 days.

(21) Appl. No.: 17/227,107

(22) Filed: Apr. 9, 2021

(65) Prior Publication Data
US 2021/0345741 A1    Nov. 11, 2021

Related U.S. Application Data

(63) Continuation of application No. 14/223,323, filed on Mar. 24, 2014, now Pat. No. 10,973,293.
(Continued)

(51) Int. Cl.
*A45C 11/00* (2006.01)
*H04B 1/3888* (2015.01)

(52) U.S. Cl.
CPC ............ *A45C 11/00* (2013.01); *H04B 1/3888* (2013.01); *A45C 2011/002* (2013.01); *Y10T 29/49826* (2015.01)

(58) Field of Classification Search
CPC .............. A45C 11/00; A45C 2011/001; A45C 2011/002; A45C 2011/003; H04B 1/3888
See application file for complete search history.

(56) References Cited

U.S. PATENT DOCUMENTS

| 1,613,536 A | 1/1927 | Rose |
| 4,259,568 A | 3/1981 | Dynesen |
(Continued)

FOREIGN PATENT DOCUMENTS

| CN | 201806105 U | 4/2011 |
| CN | 102370309 A | 3/2012 |
(Continued)

OTHER PUBLICATIONS

International Search Report in related PCT Application No. CT/US2014/50650, dated Nov. 20, 2014.
(Continued)

*Primary Examiner* — Ernesto A Grano
(74) *Attorney, Agent, or Firm* — Neal, Gerber & Eisenberg LLP

(57) ABSTRACT

A composite case for an electronic device is provided. The composite case includes: a resilient portion dimensioned to cover two end portions of the electronic device and less than half of a back portion of the electronic device; and a rigid portion dimensioned to fit with the resilient portion, the rigid portion dimensioned to provide a cover for at least part of the back portion of the electronic device. A method of protecting an electronic device is provided. The method includes: attaching a rigid material to a resilient material; dimensioning both the rigid material and the resilient material to contain an electronic device; configuring the rigid material, but not the resilient material, to cover most or all of a back portion of the electronic device; and providing an
(Continued)

opening to allow a screen portion of the electronic device to be accessed through the opening in the rigid and resilient material.

20 Claims, 12 Drawing Sheets

Related U.S. Application Data

(60) Provisional application No. 61/866,465, filed on Aug. 15, 2013.

(56) References Cited

U.S. PATENT DOCUMENTS

| | | |
|---|---|---|
| 6,772,879 B1 | 8/2004 | Domotor |
| 7,281,698 B2 | 10/2007 | Patterson, Jr. |
| 7,414,833 B2 | 8/2008 | Kittayapong |
| 7,641,046 B2 * | 1/2010 | Tsang .................... A45C 11/18 |
| | | 206/320 |
| 7,735,644 B2 | 6/2010 | Sirichai et al. |
| 7,938,260 B2 | 5/2011 | Lin |
| D646,673 S * | 10/2011 | Fathollahi .................... D14/250 |
| D658,187 S | 4/2012 | Diebel |
| D658,188 S | 4/2012 | Diebel |
| D663,304 S | 7/2012 | Akana et al. |
| 8,230,992 B2 | 7/2012 | Law et al. |
| 8,245,843 B1 | 8/2012 | Wu |
| 8,251,210 B2 * | 8/2012 | Schmidt ................. H04M 1/04 |
| | | 455/575.8 |
| 8,312,991 B2 | 11/2012 | Diebel et al. |
| D671,948 S | 12/2012 | Akana et al. |
| D672,353 S | 12/2012 | Liu |
| D672,781 S | 12/2012 | Lu |
| D675,625 S | 2/2013 | Hasbrook et al. |
| D678,260 S | 3/2013 | Bau |
| D679,279 S | 4/2013 | Yang et al. |
| D679,715 S | 4/2013 | Akana et al. |
| 8,424,830 B2 | 4/2013 | Yang et al. |
| D681,641 S | 5/2013 | Van et al. |
| D682,836 S | 5/2013 | Akana et al. |
| D682,838 S | 5/2013 | Akana et al. |
| 8,439,191 B1 * | 5/2013 | Lu .......................... A45C 11/00 |
| | | 455/575.8 |
| D687,438 S | 8/2013 | Lu |
| D690,305 S | 9/2013 | Wen |
| D690,702 S | 10/2013 | Chung |
| D691,142 S | 10/2013 | Diebel |
| D692,434 S | 10/2013 | Kim |
| D693,141 S | 11/2013 | Wootten, Jr. |
| D693,823 S | 11/2013 | Chen et al. |
| D695,296 S | 12/2013 | Hsu |
| D696,253 S | 12/2013 | Akana et al. |
| D696,256 S | 12/2013 | Piedra et al. |
| D696,669 S | 12/2013 | Akana et al. |
| 8,640,864 B2 | 2/2014 | Chen et al. |
| 8,644,893 B2 | 2/2014 | Liang |
| 8,657,112 B2 | 2/2014 | Igarashi |
| D701,205 S | 3/2014 | Akana et al. |
| D702,673 S | 4/2014 | Murchison et al. |
| 8,695,798 B2 * | 4/2014 | Simmer .................. A45C 11/00 |
| | | 206/320 |
| D704,689 S | 5/2014 | Chang |
| D704,693 S | 5/2014 | Kim |
| D706,270 S | 6/2014 | Akana et al. |
| D706,783 S | 6/2014 | Almodova |
| D707,229 S | 6/2014 | Almodova |
| 8,757,375 B2 | 6/2014 | Huang |
| D708,838 S | 7/2014 | Lee |
| 8,763,795 B1 | 7/2014 | Oten et al. |
| 8,766,921 B2 | 7/2014 | Ballagas et al. |
| 8,773,353 B2 | 7/2014 | Wei |
| 8,783,458 B2 | 7/2014 | Gallagher et al. |
| D710,859 S | 8/2014 | Mecchella et al. |
| 8,797,132 B2 | 8/2014 | Childs et al. |
| D718,316 S | 11/2014 | Veltz et al. |
| 8,919,549 B1 * | 12/2014 | Tashjian ................. A45C 3/001 |
| | | 455/575.8 |
| D733,154 S | 6/2015 | Armstrong et al. |
| D737,263 S | 8/2015 | Armstrong et al. |
| D737,276 S | 8/2015 | Armstrong et al. |
| 9,182,785 B2 * | 11/2015 | Wyner ....................... A45F 5/00 |
| 9,241,551 B2 * | 1/2016 | Lawson .................. A45C 13/02 |
| 9,532,633 B1 * | 1/2017 | Tan ............................ B44C 5/00 |
| 9,795,044 B2 * | 10/2017 | Lai ........................ H05K 5/0086 |
| 9,800,962 B2 * | 10/2017 | Lai ............................ H04R 1/02 |
| 9,853,674 B2 * | 12/2017 | Gandhi ................... H04M 1/026 |
| 2003/0034263 A1 | 2/2003 | D Hoste |
| 2008/0083631 A1 | 4/2008 | Tsang et al. |
| 2008/0302687 A1 | 12/2008 | Sirichai et al. |
| 2009/0036175 A1 * | 2/2009 | Brandenburg .......... A45F 5/021 |
| | | 455/575.1 |
| 2009/0072786 A1 * | 3/2009 | Lin .......................... A45F 5/021 |
| | | 439/366 |
| 2009/0080153 A1 * | 3/2009 | Richardson ............... A45F 5/00 |
| | | 361/679.55 |
| 2009/0159763 A1 | 6/2009 | Kim |
| 2010/0072334 A1 * | 3/2010 | Le Gette ................. F16M 11/10 |
| | | 29/428 |
| 2010/0096284 A1 * | 4/2010 | Bau ......................... B65D 85/00 |
| | | 206/592 |
| 2010/0122756 A1 | 5/2010 | Longinotti-buitoni |
| 2010/0147737 A1 | 6/2010 | Richardson et al. |
| 2010/0240427 A1 * | 9/2010 | Lee ....................... H04B 1/3888 |
| | | 455/575.8 |
| 2011/0036876 A1 | 2/2011 | Fathollahi |
| 2011/0095033 A1 * | 4/2011 | Hung ................... H04B 1/3888 |
| | | 220/602 |
| 2011/0228459 A1 * | 9/2011 | Richardson .......... H04B 1/3888 |
| | | 361/679.01 |
| 2011/0266194 A1 | 11/2011 | Bau |
| 2011/0290687 A1 | 12/2011 | Han |
| 2011/0294542 A1 | 12/2011 | Ray et al. |
| 2012/0018325 A1 | 1/2012 | Kim |
| 2012/0071217 A1 * | 3/2012 | Park ....................... A45C 11/00 |
| | | 455/575.8 |
| 2012/0091025 A1 * | 4/2012 | Wyner ................... A45C 11/00 |
| | | 206/521 |
| 2012/0168056 A1 * | 7/2012 | Antonini ................. B32B 25/20 |
| | | 156/289 |
| 2012/0168336 A1 * | 7/2012 | Schmidt ................. H04M 1/04 |
| | | 206/478 |
| 2012/0211377 A1 | 8/2012 | Sajid |
| 2012/0211613 A1 | 8/2012 | Yang et al. |
| 2012/0228181 A1 * | 9/2012 | Damon ................ A45C 13/002 |
| | | 206/521 |
| 2012/0261289 A1 * | 10/2012 | Wyner .................. G06F 1/1626 |
| | | 206/320 |
| 2012/0305413 A1 | 12/2012 | Chung |
| 2012/0305422 A1 | 12/2012 | Vandiver |
| 2012/0308981 A1 | 12/2012 | Libin et al. |
| 2012/0325720 A1 * | 12/2012 | Tages .................... G06F 1/1633 |
| | | 206/522 |
| 2013/0015088 A1 | 1/2013 | Wu |
| 2013/0020216 A1 | 1/2013 | Chiou |
| 2013/0043777 A1 * | 2/2013 | Rayner ................. G06F 1/1656 |
| | | 312/223.1 |
| 2013/0063874 A1 * | 3/2013 | Yi ........................... G06F 1/1656 |
| | | 361/679.01 |
| 2013/0098788 A1 * | 4/2013 | McCarville ............. A45C 11/00 |
| | | 206/320 |
| 2013/0098790 A1 * | 4/2013 | Hong .................... B28B 11/001 |
| | | 206/320 |
| 2013/0118932 A1 * | 5/2013 | Green ................... H04B 1/3888 |
| | | 206/424 |
| 2013/0118934 A1 * | 5/2013 | Green ..................... A45C 11/00 |
| | | 206/320 |
| 2013/0140203 A1 | 6/2013 | Chiang |
| 2013/0175186 A1 | 7/2013 | Simmer |
| 2013/0181584 A1 | 7/2013 | Whitten et al. |
| 2013/0213838 A1 | 8/2013 | Tsai et al. |

(56) References Cited

U.S. PATENT DOCUMENTS

| | | | |
|---|---|---|---|
| 2013/0214661 A1 | 8/2013 | Mcbroom | |
| 2013/0241381 A1 | 9/2013 | Dukerschein et al. | |
| 2013/0264459 A1 | 10/2013 | Mccosh et al. | |
| 2014/0045557 A1* | 2/2014 | Chung | H04M 1/0249 455/575.1 |
| 2014/0112652 A1* | 4/2014 | Latto | H05K 5/0243 396/439 |
| 2014/0221056 A1* | 8/2014 | Gandhi | H04B 1/3888 455/575.8 |
| 2014/0252786 A1* | 9/2014 | Singhal | H04B 1/3888 294/137 |
| 2015/0207911 A1* | 7/2015 | Lin | H04M 1/035 455/569.1 |

FOREIGN PATENT DOCUMENTS

| | | |
|---|---|---|
| CN | 202233576 U | 5/2012 |
| EP | 3033282 A1 | 6/2016 |
| HK | 1222157 B | 8/2019 |
| JP | 2003100140 A | 4/2003 |
| JP | 2005115212 A | 4/2005 |
| JP | 3153901 U | 9/2009 |
| JP | 3170660 U | 9/2011 |
| JP | 2013058883 A | 3/2013 |
| JP | 2014-514763 A | 6/2014 |
| WO | WO2012/099869 A2 | 7/2012 |
| WO | WO2012/142524 A1 | 10/2012 |
| WO | WO2013/096927 A1 | 6/2013 |
| WO | WO 2014124116 A1 | 8/2014 |

OTHER PUBLICATIONS

Japanese Patent Office; Notice of Reasons for Rejection, Issued in Connection to JP2016-534785; dated Oct. 2, 2018; 16 pages.
Japan Communication Pursuant to Article 94(3) EPC Received for European Patent Office Application No. 14836849.1, dated Jan. 22, 2019, 4 pages.
Extended European Search Report received for EP Application No. 14836849.1, dated Mar. 21, 2017, 7 pages.
Notice of Reasons for Refusal dated Aug. 27, 2019 in Japan Patent Application No. 2016-534785.
Office Action dated May 16, 2017 in China Patent Application No. 201480045278.9.
Office Action dated Nov. 8, 2017 in China Patent Application No. 201480045278.9.
Office Action dated Sep. 27, 2016 in China Patent Application No. 201480045278.9.
"Communication Pursuant to Article 94(3) EPC Received for European Patent Office Application No. 14836849.1, dated Nov. 14, 2019, 3 pages."
"First Examination Report received for AU application 2018260952 dated Dec. 4, 2019, 4 Pgs."
"Communication under Rule 71(3) EPC received for EP Patent Application Serial No. 14836849.1 dated Mar. 23, 2020, 6 pages".
"Examiners Decision of Final Refusal Received (Decision of Rejection) for Japan Application No. 2016-534785, dated Mar. 9, 2020".

* cited by examiner

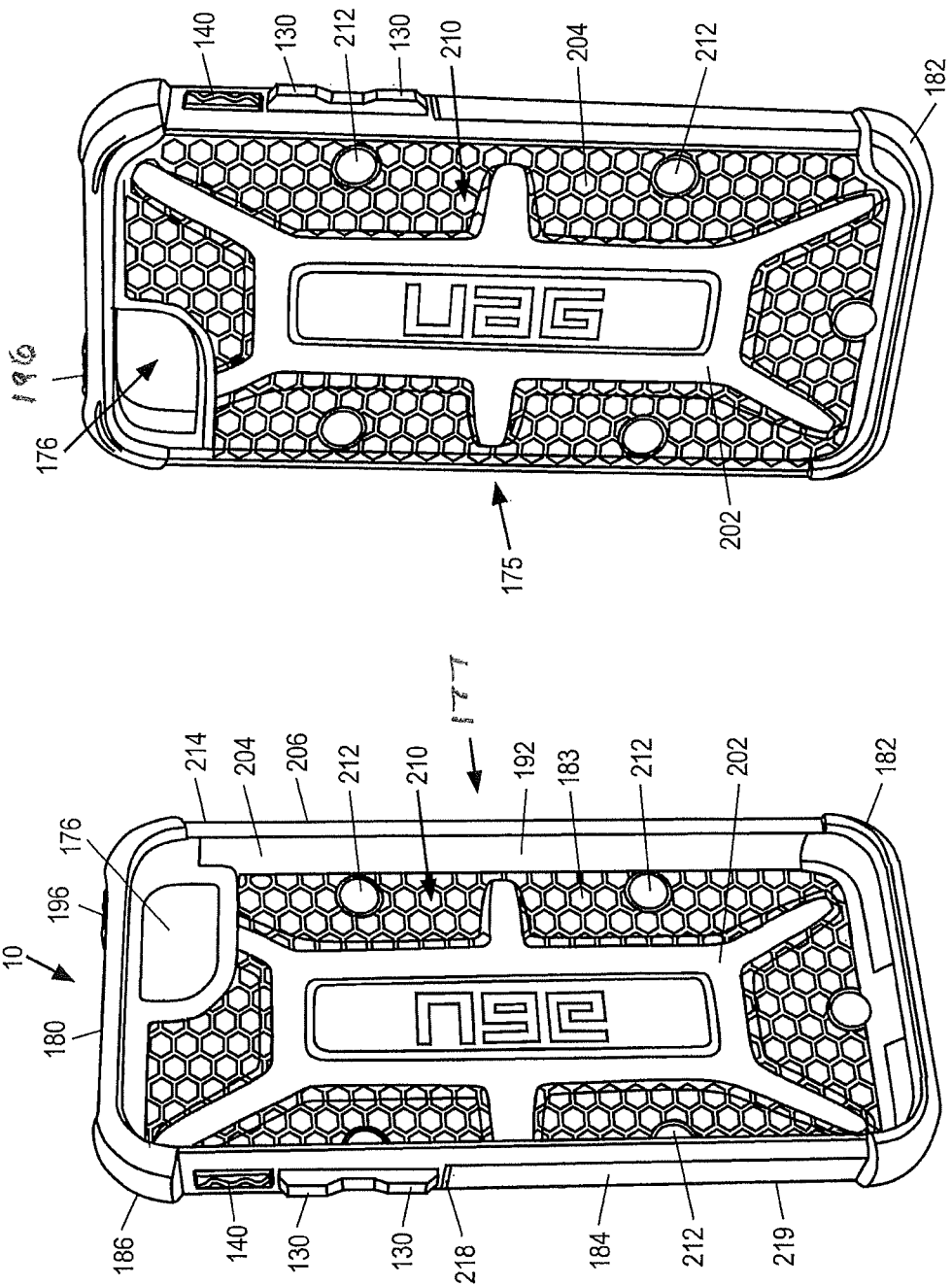

COMPOSITE PROTECTIVE CASE FOR PHONES, OTHER PORTABLE ELECTRONIC DEVICES AND OTHER APPARATUS

CROSS-REFERENCE TO RELATED APPLICATIONS

This application claims priority to provisional U.S. patent application entitled, NOVEL ENHANCED COMPOSITE PROTECTIVE CASES FOR PHONES, PORTABLE ELECTRONIC DEVICES, AND OTHER APPARATUS, filed Aug. 15, 2013, having a Ser. No. 61/866,465, the disclosure of which is hereby incorporated by reference in its entirety.

COPYRIGHT DISCLOSURE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates generally to protective cases. More particularly, the present invention relates to a protective case for a portable electronic device.

BACKGROUND OF THE INVENTION

There are a number of protective cases available for a variety of cellular phones, tablet computers, PDAs and other portable consumer electronic devices. The design and construction of these cases varies widely and they offer varying degrees of protection for the device based on their design. Some cases are constructed from a simple silicon or thermoplastic polyurethane (TPU) rubber molding that provides some basic protection against drops and scratches. Others are constructed from hard injected plastic such as polycarbonate (PC) and provide similar protection. Cases are typically attached to the device through some mechanical means that seeks to impose a semi-permanent marriage of the case and the device.

The design and construction of the existing cases provide various levels of protection while also exhibiting various consumer features and benefits, as well as tradeoffs in use as viewed by the typical consumer. For example, rubber cases are economical and they provide basic protection against light drops and scratches. However, the rubber can often provide excessive unwanted grip, which makes insertion and removal of the device into a pants pocket or small purse difficult. Furthermore, when used for cellular phone cases, the rubber can become entangled in long hair when the device is being utilized to make a phone call. Rubber cases also tend to be bulky in design and do not lend themselves well to storage in tight spaces such as a pocket or small purse. Finally, some rubber materials tend to degrade over time, resulting in the case becoming loose or exhibiting an unpleasant appearance.

Conversely, depending on the design, hard plastic injection molded cases can often provide superior protection while facilitating easy insertion and retrieval from a pocket. Furthermore, these cases tend to impose a lower profile upon the device resulting in an overall smaller form factor which is desirable if the device is to be carried in a pocket or small purse. However, the hard cases can often impose significant stresses on the device if the device is dropped since the hard plastics provide little cushioning. This can be concerning in some cases as many state of the art devices employ sensitive touch screens and delicate buttons and switches. Many manufacturers of cases have sought to overcome the limitations of a single component design by coupling injection molded rubber and hard plastic components in a hybrid fashion in an attempt to achieve the protective benefits of each material while concurrently maintaining the unique positive consumer usability attributes of each.

In some cases, the rubber component is attached to the device and an injection molded hard plastic cover is mechanically attached to the anterior surface of the rubber to provide further protection while providing ease of entry and egress into a pocket or purse. In other cases, an injection molded hard case is attached to the device while a supplementary rubber component is applied to the anterior of the hard case. In the designs employing two components, typically the inner component mechanically connects to the device, while the second outer component is mechanically attached to said first component.

In other embodiments of the two piece design approach, the rubber and hard plastic components are mechanically bonded. This is most often accomplished through a manufacturing process called over-molding in which one of the components is molded first, then the second component is molded over the first component resulting in a permanent mechanical bond between the two components.

In general, protective cases that employ two component designs provide superior protection, however are not without vulnerabilities and complications. For example, a violent drop can still result in the device separating from one or both of the protective elements described above, resulting in damage to the device. Also, a drop can result in the case components becoming separated from each other again resulting in damage to the device or a nuisance to the consumer. Furthermore, many cases employ elaborate mechanical means to attach all the components together resulting in frustration for the user when installing their device in the case or in the event the device needs to be intentionally removed from the protective case.

Another challenge of current case designs is that a current trend of ever increasing screen sizes and touch screen interfaces leaves little room for mechanical elements to retain the device within the case without compromising the accessibility to the touch screen itself.

It would be desirous to have a case that was capable of exhibiting the shock resistant benefits of a rubber inner case coupled with the consumer usability benefits of a hard plastic outer case as described above.

It would also be desirous to have a composite case that combined a rubber inner case and a hard plastic outer case in a way that formed a permanent bond between the two materials resulting in a protective system that provided the protective features described above.

It would also be desirous to have a composite case in which the geometric shape of the constituent components was such as to maximize overall structural strength and impact resistance of the composite case while minimizing material weight and size.

It would also be desirous to have a case that provided a simple means to install and remove the device from the case yet exhibited a substantial mechanical means to retain the device in the case during use or the event of a drop.

It would also be desirous to have a case that provided ample protection of the device yet does not interfere with access to buttons, ports, or the device's touchscreen.

Accordingly, it is desirable to provide a cover that provides protective cushioning for an electronic device yet does not snag on clothing or hair.

SUMMARY OF THE INVENTION

The foregoing needs are met, to a great extent, by the present invention, wherein in one aspect an apparatus is provided that in some embodiments provides a cover that provides protective cushioning for an electronic device yet does not snag on clothing or hair.

In accordance with one embodiment of the present invention, a composite case for an electronic device is provided. The composite case includes: a resilient portion dimensioned to cover two end portions of the electronic device and less than half of a back portion of the electronic device; and a rigid portion dimensioned to fit with the resilient portion, the rigid portion dimensioned to provide a cover for at least part of the back portion of the electronic device.

In accordance with another embodiment of the present invention, a method of protecting an electronic device is provided. The method includes: attaching a rigid material to a resilient material; dimensioning both the rigid material and the resilient material to contain an electronic device; configuring the rigid material, but not the resilient material, to cover most or all of a back portion of the electronic device; and providing an opening to allow a screen portion of the electronic device to be accessed through the opening in the rigid and resilient material.

In accordance with yet another embodiment of the present invention, a composite case for an electronic device is provided. The composite case may include: a resilient portion dimensioned to cover two end portions of the electronic device and less than half of a back portion of the electronic device; and a rigid portion dimensioned to fit with the resilient portion, the rigid portion dimensioned to provide a cover for at least part of the back portion of the electronic device; a region in the rigid portion defining honeycomb shapes; a region of the rigid portion that is raised toward an electronic device contained by the case; and wherein the raised region is generally rectangular with lines radiating from corners of the rectangle and a center portion of the rectangle.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 11 is a front, isometric view of a case according to an embodiment.

FIG. 12 is a rear, isometric view of a case according to an embodiment.

DETAILED DESCRIPTION

Figure 1:
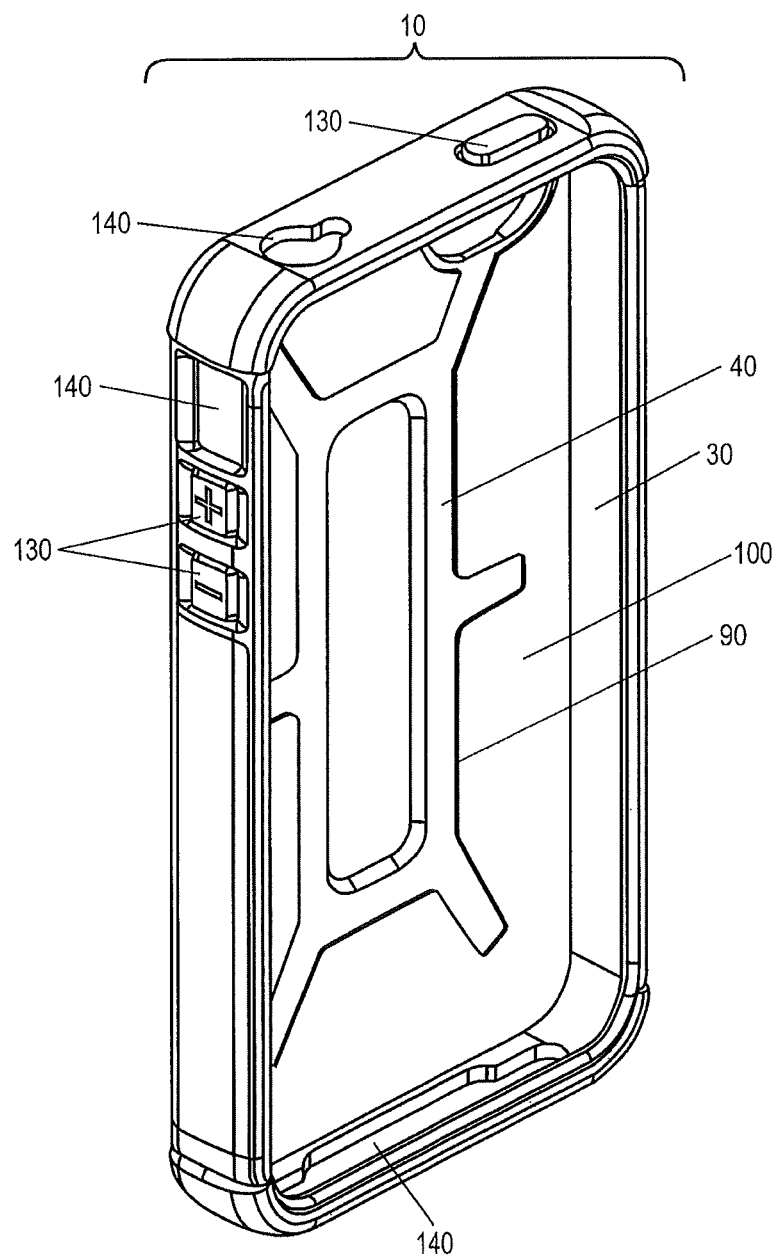
FIG. 1 is a left, front, perspective view of an embodiment in accordance with the present disclosure.

The embodiments in accordance with the invention will now be described with reference to the drawing figures, in which like reference numerals refer to like parts throughout. An embodiment in accordance with the present invention provides a cover for a portable electronic device such as a smart phone or any other portable electronic device. The cover is made of multiple parts, a hard part and a resilient part. The resilient part provides cushioning for the electronic device and the hard part provides protection as well as a relatively slick surface to make the cover easy to put in and out of a pocket, purse, and does not entangle with long hair.

Embodiments in accordance with the present invention can be applied to several modifications of cases as they pertain to cell phones, tablet computers, PDAs and numerous other portable electronic devices. For illustration purposes, an embodiment in accordance with the present invention is shown as a cell phone case although other devices would employ similar details, features and benefits.

The following description, and the figures to which it refers, are provided for the purposes of describing examples and specific embodiments of the invention only and are not intended to exhaustively describe all possible examples and embodiments of the invention.

A two part composite case is provided to encapsulate and protect a variety of cellular phones, tablet computers PDAs and numerous portable consumer electronic devices. Some embodiments include a two-part case made of an injection molded TPU rubber inner case and an injection molded polycarbonate outer case.

The polycarbonate outer case, in some embodiments, features a base that protects the rear of the device, and two parallel side walls that protrude vertically from the base. The geometry of the TPU rubber at the ends of the case for bumpers that encapsulate the entire ends of the device and provide added protection in the event of a drop.

The inner case and outer case are manufactured in an over molding manufacturing process that provides a permanent bond between said inner case and outer case forming a two-piece composite case protective system. When the device is installed inside the composite case, the case and device are substantially coexistive through a mechanical means so that a protective system is established that provides resistance to impacts, sharp objects, shock and scratches to the device.

Although the example and embodiment used herein may refer to a cellular phone application, this is by way of example rather than limiting. The present invention is intended to also be used with PDAs, smartphones, tablet computers, electronic games, gaming devices, internet browsing devices, portable computing devices and other numerous consumer electronic devices.

In addition to the composite combination of the TPU inner case and the polycarbonate outer case, some embodiments employ several unique design elements that act together forming a system to provide the following benefits: maximize protection of the device being housed within the case, facilitate easy installation and removal of the device from the case, provide easy access to all device buttons and ports, and accomplish all this through an efficient mechanical design that minimizes weight and size of the device and case assembly.

Figure 2:
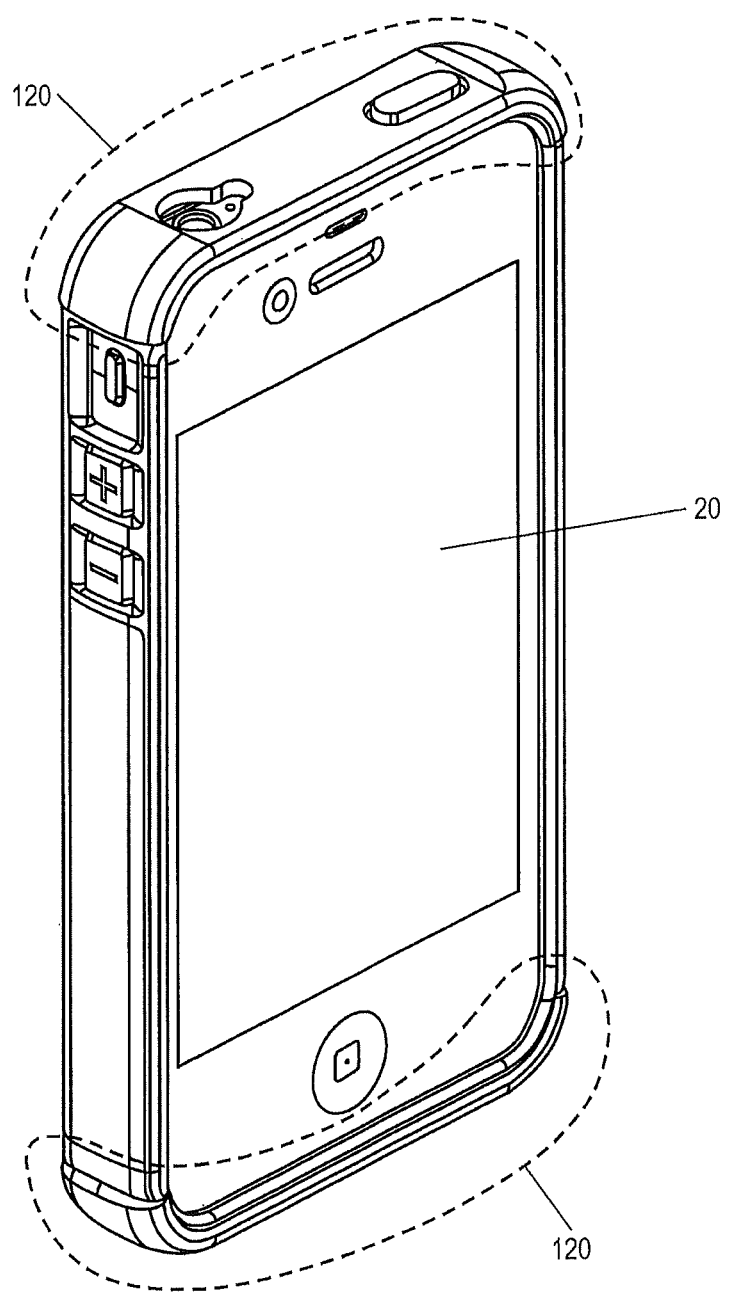
FIG. 2 is a left, front, perspective view of an embodiment in accordance with the present disclosure housing a typical cell phone.
Figure 3:
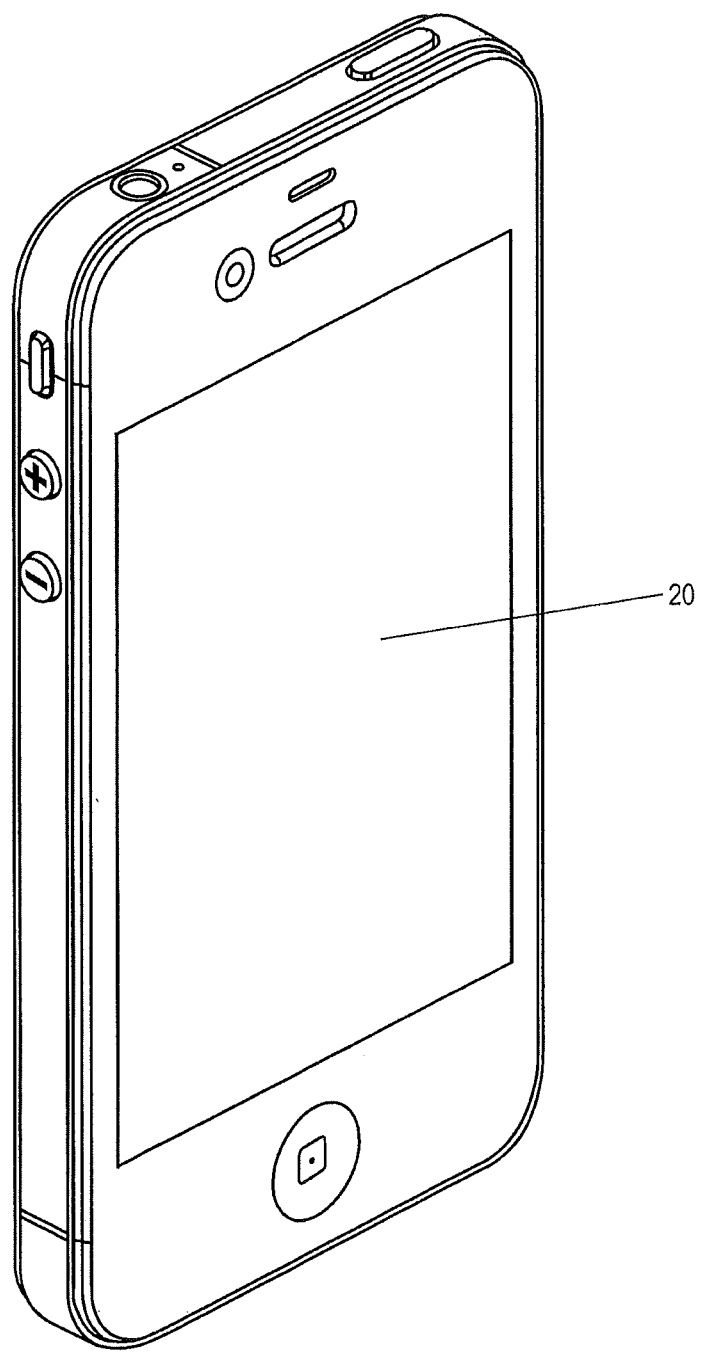
FIG. 3 is a left, front, perspective view of a typical cell phone used for illustrative purposes.

Referring to FIG. 1 in one embodiment, a device case 10 is shown housing a cellular phone device 20 in FIG. 2. The particular phone device 20 separately shown in FIG. 3 is for illustrative purposes only and various embodiments are applicable to other phone designs as well as other portable consumer electronic devices as described earlier. The case is comprised of two components including a TPU soft rubber inner case 30 and a polycarbonate (PC) hard plastic injection molded outer case 40 shown in an exploded view in FIG. 4. The outer case 40 features a base and two parallel side walls 160 that protrude vertically from the base. The inner case 30 and outer case 40 are manufactured in a manufacturing process called over molding. In this process, the PC outer case 40 is injection molded first and then the TPU inner case 30 is molded around the outer case 40. This process forms a permanent mechanical bond between the inner case and outer case resulting in the composite case assembly shown in FIG. 1.

Figure 4:
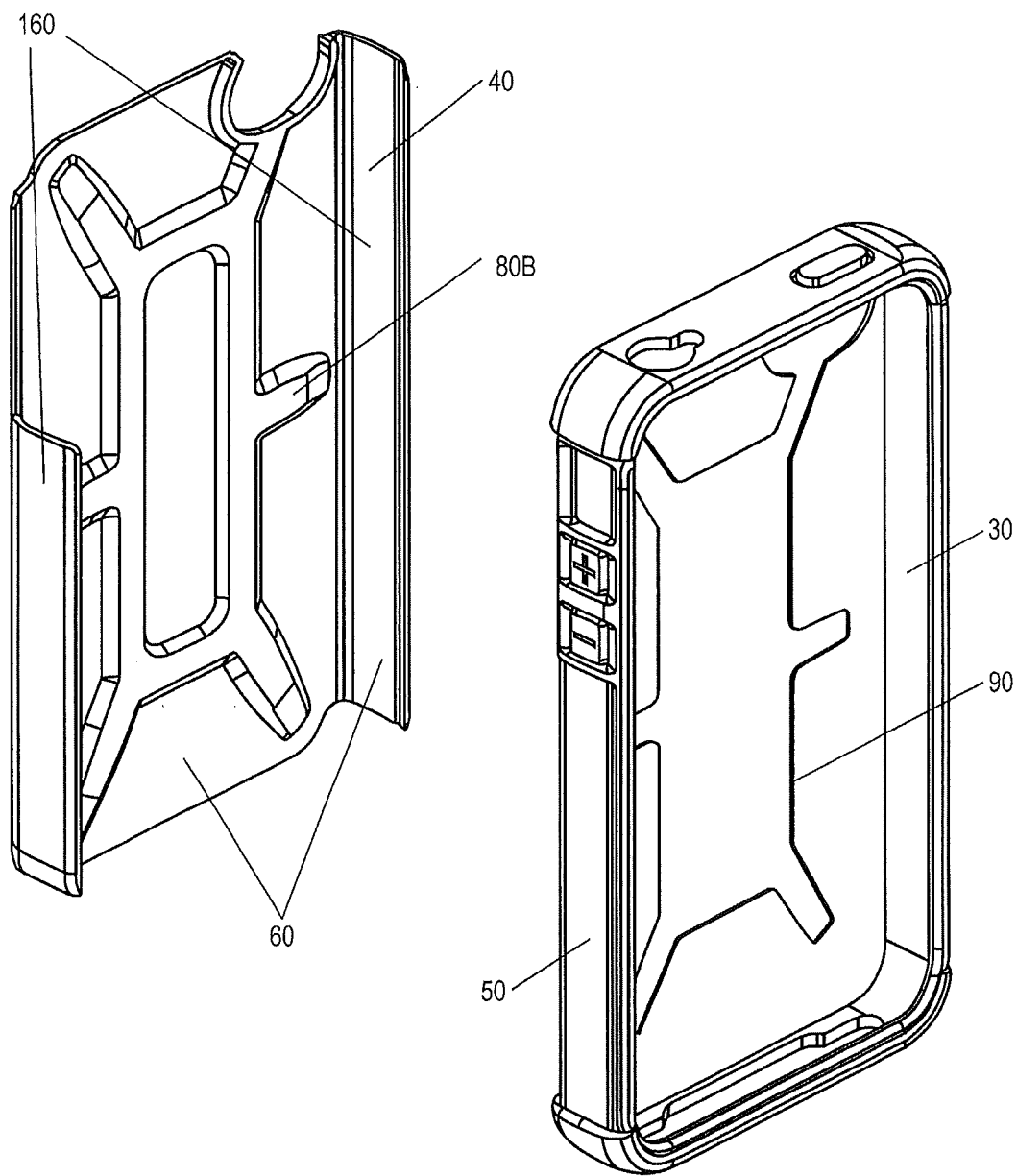
FIG. 4 is a left, front, perspective exploded view of components present in some embodiments.
Figure 5:
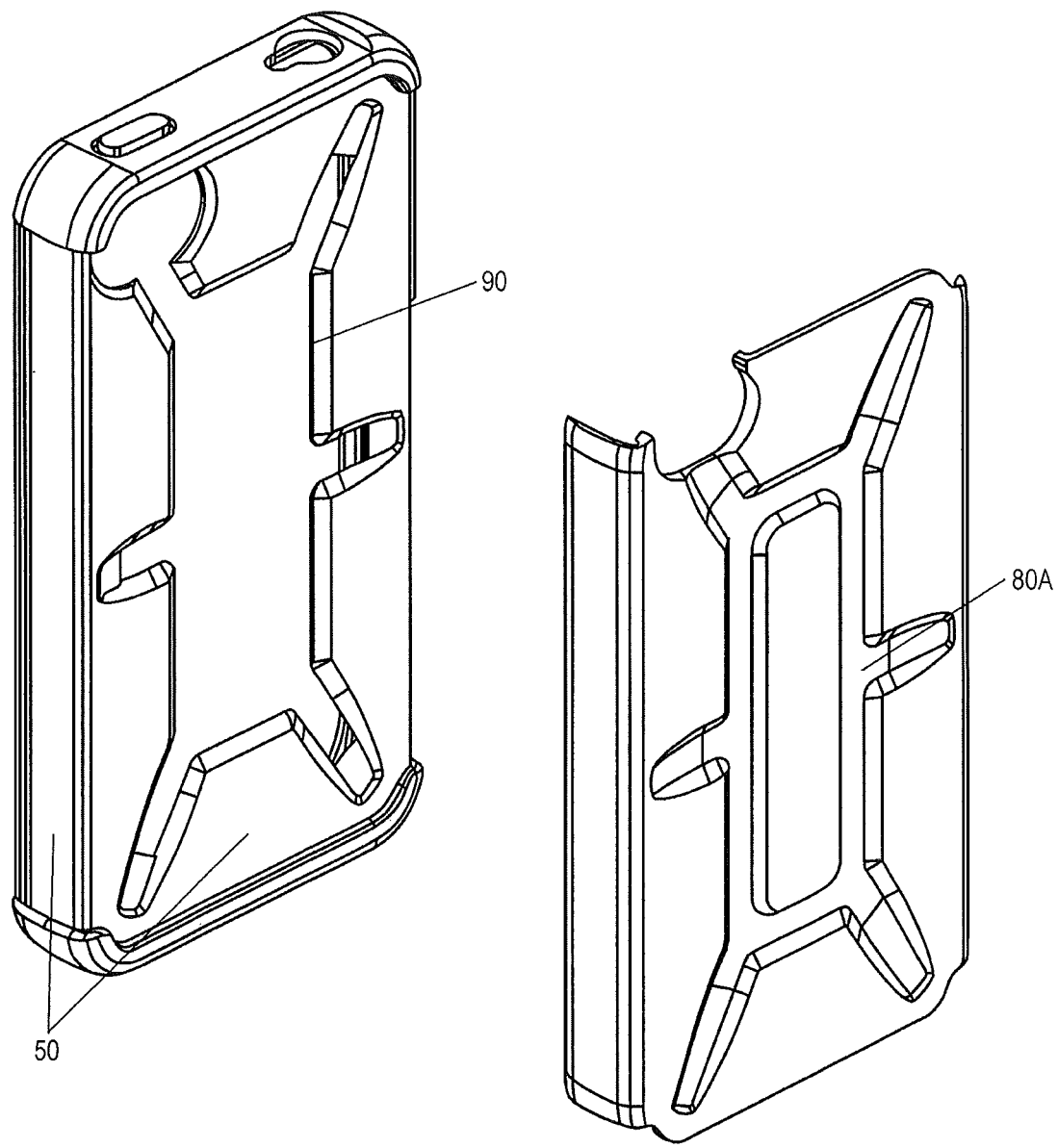
FIG. 5 is a right, rear, perspective exploded view of components present in some embodiments.
Figure 6:
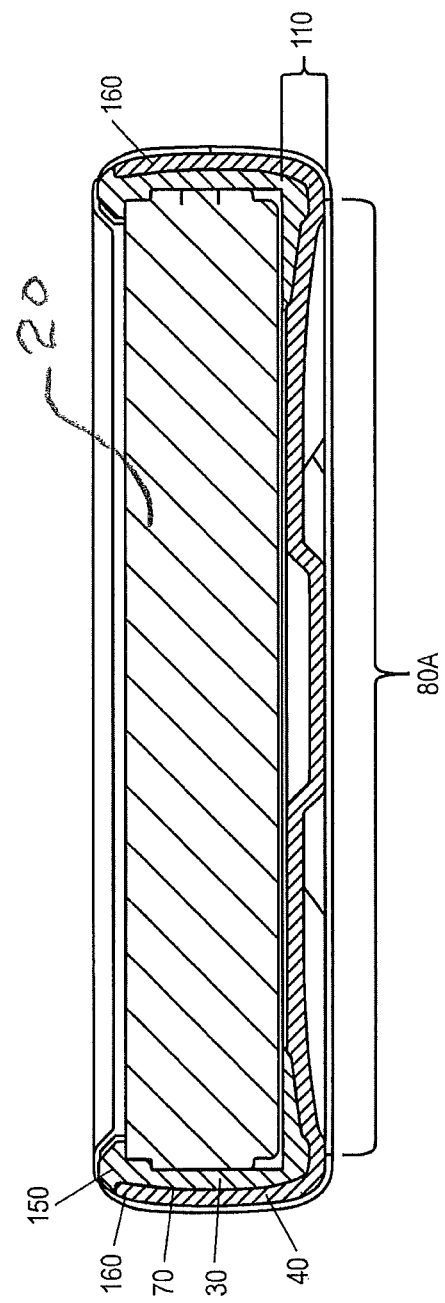
FIG. 6 is a mid-plane cross sectional view of a case assembly in accordance with some embodiments housing a typical cell phone.

FIG. 5 shows a right rear exploded view of the case components. The surfaces 50 of the inner case 30 that bonds with the surfaces 60 of the outer case 40 is illustrated in FIGS. 4 and 5. This interface between the inner case 30 and outer case 40 is further illustrated in the mid-plane cross sectional view shown in FIG. 6. As described earlier, the inner case 30 provides a soft impact resistant layer of protection for the device 20. This is illustrated in FIG. 6 as the inner case 30 is shown to encapsulate the device 20. The outer case 40 provides an outer structural stiffness to the case and resistance to knocks or sharp objects. The outer case also facilitates certain consumer usage benefits including easy insertion and removal of the case 10 from a pocket and no tangling of the rubber with hair during phone calls.

Figure 7:
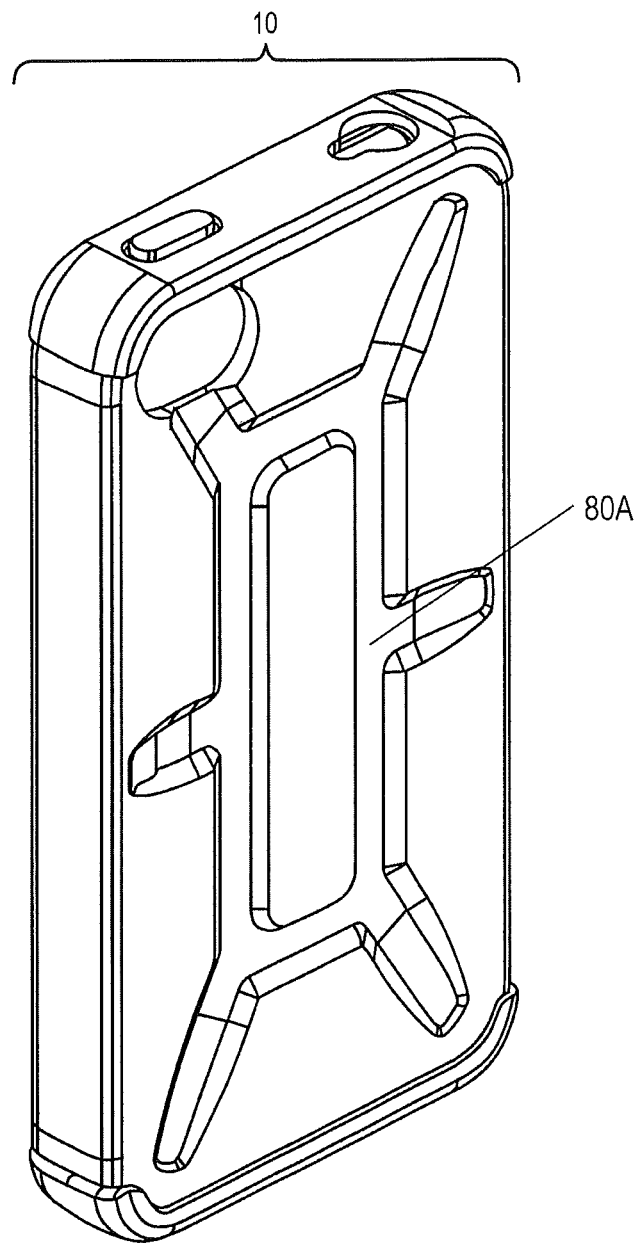
FIG. 7 is a right, rear, perspective view of an embodiment in accordance with this disclosure.

FIG. 7 illustrates a right rear view of an embodiment of the device case 10 and highlights the unique geometric design 80A formed in the rear of the outer case 40. The shape illustrated is present in some embodiments, other variations of this geometry may be proposed that offer similar behavior as this would be apparent to those skilled in the art. The inside of this geometric design 80B carries through to the inside of the outer case 40 and is illustrated in FIG. 4. An appropriate mating geometry 90 shown in FIG. 5 results in the inner case 30 during the over molding process and forms the interface 70 of the two materials seen in FIG. 6. This geometric design 80A of the outer case and resulting interface 70 with the inner case 30 is shown in the cross-sectional view of FIG. 6. The unique shape of the geometric design 80A formed in the outer case 40 acts to stiffen and strengthen the outer case structure in an efficient fashion so as to minimize size and weight.

This concept will be familiar to those skilled in the art of mechanical design and strength of materials. The mating geometry 90 in the inner case is also a means to accommodate the geometric design 80B without having to provide a continuous surface on the inside of the case 100 (FIG. 1) thereby resulting in minimal thickness and weight of the overall case 10. This is further illustrated in FIG. 6 as the overall thickness 110 of the rear of the case 10 is minimized given the interaction of the two individual case components 30, 40 while maximizing strength. The view in FIG. 1 that shows the inside surface 60 of the case 10 where the device 20 sits also illustrates the resulting exposure of the outer case 40 showing through the mating geometry 90 of the inner case 30.

In addition to the inherent protective benefits of the composite design of the case 10, the components also feature other details that further contribute to the protective abilities and utility of the case 10. When combined, the unique respective designs of the inner case 30 and parallel walls 160 of the outer case 40 result in exposed rubber bumpers 120 shown in FIG. 2 on each end of the case that correspond to the top and bottom ends of the device 20. In some embodiments, the bumpers 120 may be part of the resilient inner portion 30. The geometry of the bumpers 120 provides additional protection for the device 20 in the event of a drop. The bumpers 120 also feature appropriate buttons 130 and ports 140 shown in FIG. 1 to allow interaction with the device 20. Furthermore, the flexible TPU rubber bumpers 120 facilitate easy insertion of the device 20 into the case 10.

Conversely, the flexible design also allows easy removal of the device 20 by providing a means to stretch the bumpers 120 away from the device 20 thereby allowing access to the device 20 body for removal.

The inner case 30 also features a lip 150 molded into the TPU rubber that holds the device 20 in place when installed in the case 10 as shown in FIG. 6. When removing the device 20, stretching the rubber lip 150 away from the device 20 allows the device to be pried out the case 10. The parallel orientation of the vertical side walls 160 of the polycarbonate exterior case 40 are also allowed to flex away from the device 20 further facilitating removal of the device 20. It will be appreciated that embodiments have been described here above with reference to certain examples or embodiments as shown in the drawings. Various additions, deletions, changes and alterations may be made to the above-described embodiments and examples without departing from the intended spirit and scope of this invention. Accordingly, it is intended that all such additions, deletions, changes and alterations be included within the scope of any claims that are granted in connection with this specification.

Figure 8:
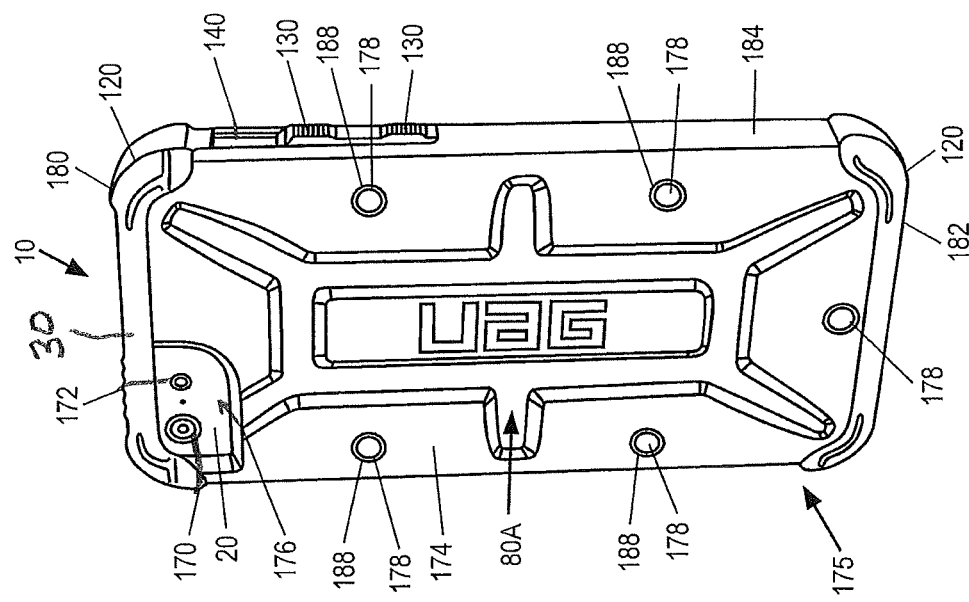
FIG. 8 is a rear, isometric view of a case according to an embodiment.

FIG. 8 illustrates another embodiment of a case 10 for an electronic device 20. The case 10 includes a resilient portion 30 and a relatively hard portion 40. In FIG. 8, a rear portion or back 175 of the case 10 is shown. An electronic device or cell phone 20 is located in the case 10. The case 10 has an open section 176 in the back 174 of the hard portion 40 of the case 10 thereby exposing the electronic device 20. In addition to exposing the device 20, the open section 176 also exposes a flashbulb 172 and camera lens 170 associated with electronic device 20. In other embodiments, an open section 176 may be located anywhere in the case 10 to expose features such as a camera lens 170, flash 172 or any other features of electronic device 20 which are desired to be exposed in order for those features to work. The open section 176 is not limited to the location illustrated in FIG. 8 but maybe moved to provide exposure of any device 20 features desired to be exposed.

The case 10 includes a resilient anchors 178 that extend through holes 188 in the hard portion 40 of the case 10. The resilient anchors 178 may be dimensioned and configured to contact the electronic device 20 to help secure and cushion the electronic device 20 within the case 10. In some embodiments, the resilient anchors 178 may be press fit with in the holes 188 in the hard portion 40 of the case 10.

In the embodiment shown in FIG. 8, the hard portion 40 of the case 10 also includes a geometric design 80A. The geometric design 80A may be dimensioned so that the part of the hard case 40 that is part of the geometric design 80A is closer to the electronic device 20 then the remaining portions of the hard portion 40 as shown. In other words, this geometric design 80A may appear to be embossed to form a dent in the back of the hard portion 40 of the case 10. In other embodiments, the geometric design 80A may be raised with respect to the back 174 of the hard portion 40. In such embodiments, the geometric design 80A will be farther away from the electronic device 20 then the rest of the hard portion 40 of the case 10.

As shown in FIG. 8, the case 10 includes a resilient portion 30 which include bumpers 120. The bumpers 120 include an upper bumper 180 and the lower bumper 182. In some embodiments, the bumpers 120 are located above and below the hard portion 40 of the case 10. As a result, the bumpers 120 provide some protection against impact at the top and bottom of the case 10.

The hard portion 40 of the case 10 may also include a side portion 184. The side portion 184 may have openings to provide for feature appropriate buttons 130 formed in the resilient portion 30 of the case 10. As previously described, the feature appropriate buttons 130 allow a user to activate features on the electronic device 20 without actually having to contact the electronic device and provide protection for actuators located on the electronic device 20. The resilient portion 30 may also provide openings or ports 142 allow access to ports or plug-ins on electronic device 20. As such, the side wall 184 of the hard portion 40 is also open to provide access.

Figure 9:
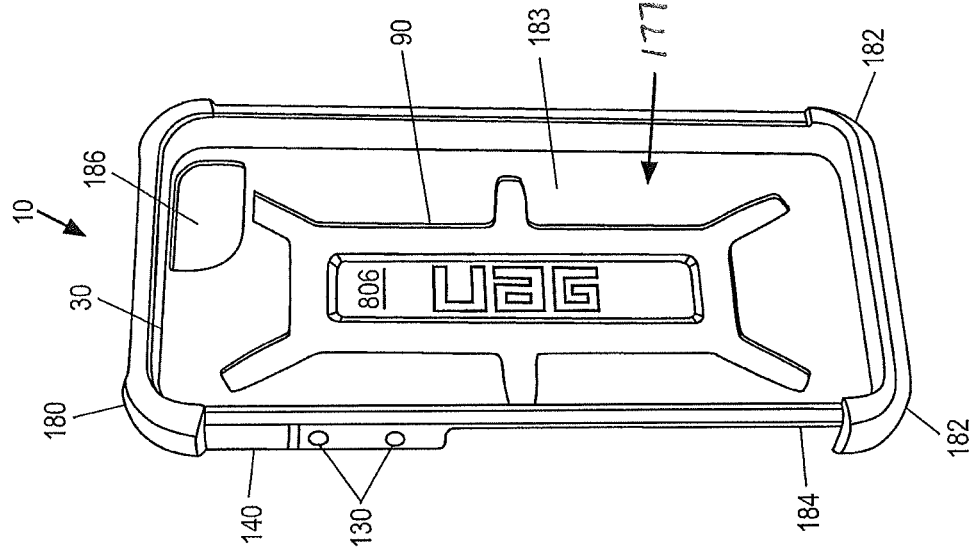
FIG. 9 is a front, isometric view of a case according to an embodiment.

FIG. 9 illustrates a front 177 of the case 10. The electronic device 20 is removed in order to better illustrate features of the case 10. The upper bumper 180 and lower bumper 182 are illustrated. The back side of the geometric design 80B is also illustrated. The back side of the geometric design 80B contacts a corresponding hole formed in the shape of appropriate mating geometry 90 in the resilient portion 30 of the case 10 to accommodate the back side of the geometric design 80B. The resilient portion 30 has the back wall 183. In some embodiments, the back wall 183 may form honeycomb shape structure 187 similar to that shown in FIG. 10.

An open section 186 in the resilient portion 30 of the case 10 is also shown. As one of ordinary skill the art will appreciate after reviewing this disclosure, the open section 186 and the resilient portion 30 is co-located with the open section 176 in the hard portion 40 in order to provide an opening to expose features of the electronic device 20 such as, for example, but not limited to, a camera lens 170 and flash 172 in the electronic device 20 as described above with respect to FIG. 8. In addition to the open section 186, the resilient portion 30, the open port 140, and the resilient portion 30, as well as the feature appropriate buttons 130 are also shown. A side 184 of the hard case 40 is shown as well as the corresponding section of the resilient portion 30.

Figure 10:
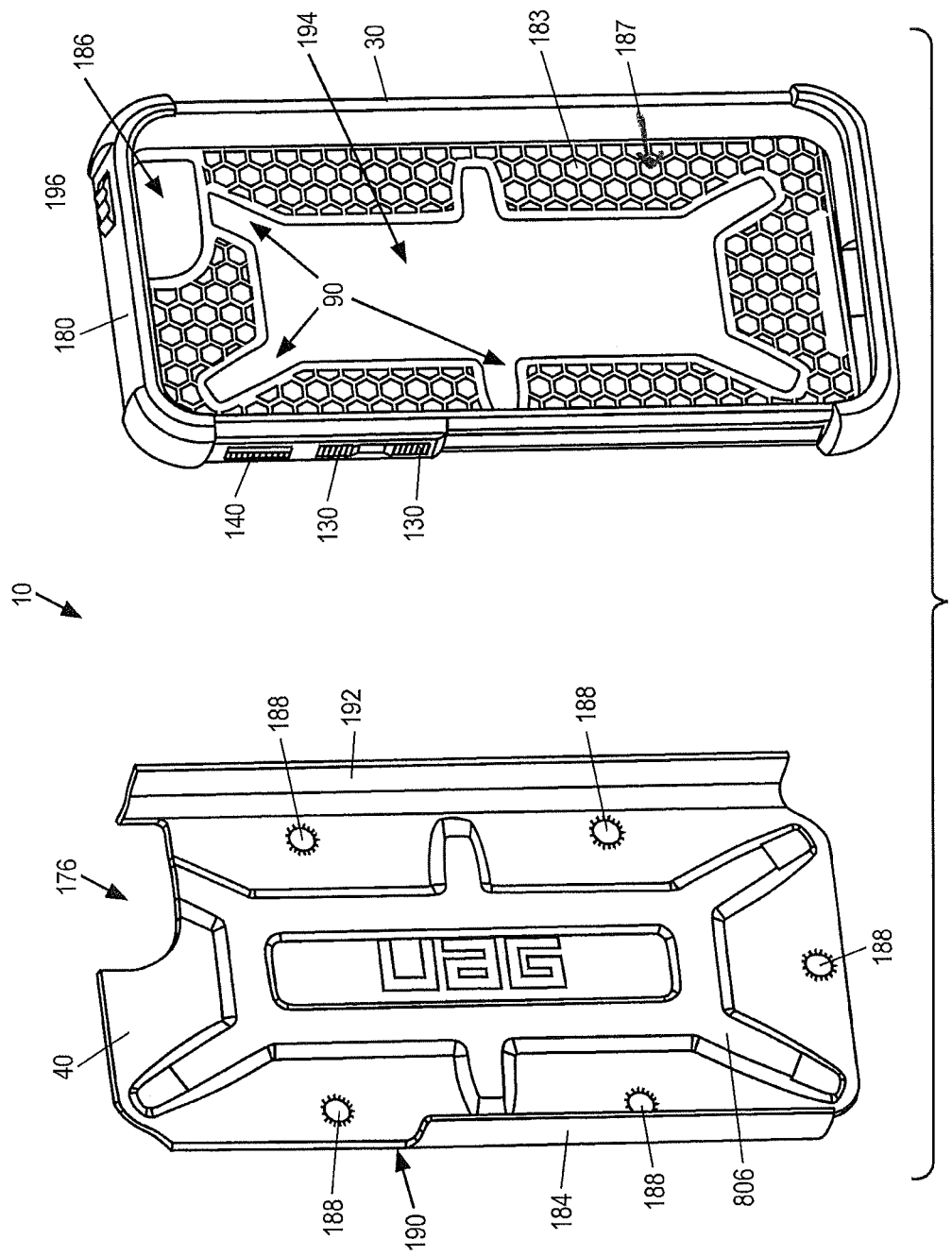
FIG. 10 is a front, exploded, isometric view of a case according to an embodiment.

FIG. 10 is an exploded isometric view of a case 10 in accordance with one embodiment. The hard plastic portion 40 is shown separated from the resilient portion 30 in order to better show the features of each. Of course, the case 10 is normally assembled as shown in FIGS. 8 and 9 but is only shown an exploded view for clarity. The open section 176 in the hard portion 40 is illustrated. The holes 188 in the hard case 40 can also be seen. The hard portion 40 also contains an absent portion 190 located above the sidewalls 24 of the hard case 40. The absent portion 190 allows the feature appropriate buttons 130 and a port 140 in the resilient portion 30 contact a phone or other device 20 when such a device 20 is located in the case 10. A second sidewall 192 of the hard portion 40 is shown located opposite the first sidewall 184. The geometric design 80B can also be seen in the hard portion 40.

The resilient portion 30 of the case 10 is also shown. The open section 186, the upper bumper 180 and lower bumper 182 are also illustrated. The feature appropriate buttons 130 and access port 140 may be seen on the left-hand side of the resilient portion 30 shown on FIG. 10. The appropriate mating geometry 90 that corresponds to the geometric design 80B may be seen in the open section 194 of the resilient portion 30. The honeycomb structure 187 located on the back wall 183 of the resilient portion 30 is illustrated. In some embodiments, the polygons of the honeycomb structure 187 may be raised up from the surface of the back wall 23. In other embodiments, polygons of the honeycomb structure 187 may be sunk with respect to the back wall 183 of the resilient portion 30 and the borders between the polygons may be raised up.

Figure 13:
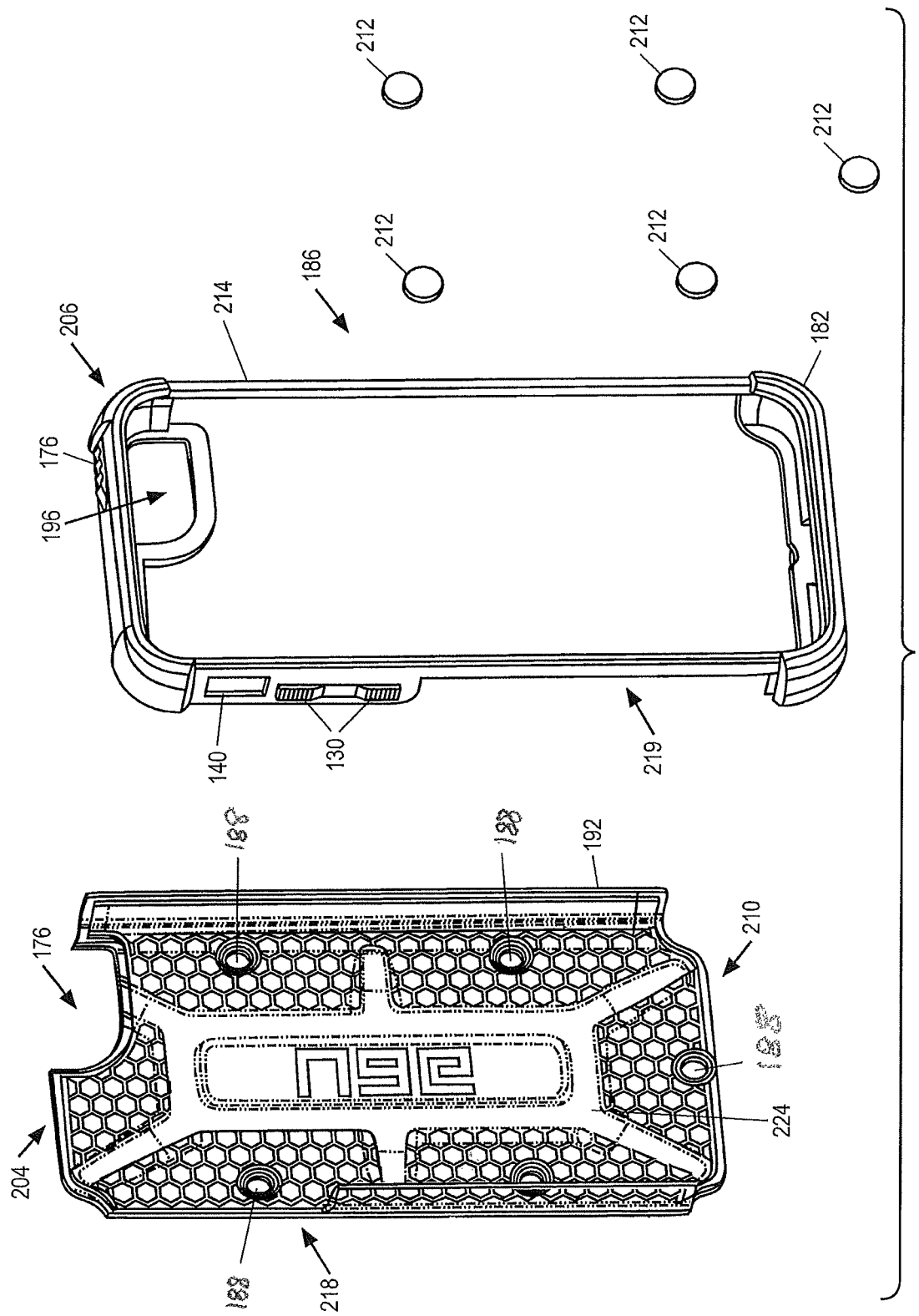
FIG. 13 is a front, exploded, isometric view of a case according to an embodiment.

FIGS. 11 and 12 are assembled views of a case 10 according to another embodiment. FIG. 13 is an exploded view of the case 10. The case shown to be in FIGS. 11, 12, and 13 may have some features with different reference numerals then shown in FIGS. 1 through 10. However, unless stated otherwise below, these features perform the same or similar functions as corresponding features discussed above and shown in FIGS. 1 to 10.

The case 10 is shown in an exploded view to better show various features of the case 10. The following description will be with respect to FIGS. 11 through 13. FIG. 11 shows the front 177 of the case 10. FIG. 12 shows the back 175 of the case 10. As shown in FIGS. 11, 12, and 13, the case 10 includes a hard portion 204 and a resilient portion 206. In some embodiments, the hard portion 204 and the resilient portion 206 may be made of the same materials as the hard portion 40 and the resilient portion 30 described above. In other embodiments, other types of materials may also be used in accordance with the present disclosure. In some embodiments, the hard portion 204 may substantially be made of a translucent or transparent material. In other embodiments, the hard portion 204 may be made of a colored material and may be available in a variety of colors.

The case 10 includes an actuator 196 located on the upper bumper 180. The actuator 196 on the case 10 permits a user to manipulate an actuator located on the electronic device such as a phone. As a result, the actuator 196 will be located on the case 10 in an area that corresponds to an actuator on an electronic device 20, for which the case 10 is designed. An open portion 176 is located in both the hard portion 204 and the resilient portion 206 to allow exposure to components such as camera lens 170 and flash 172 of electronic device 20 (not shown in FIGS. 11, 12 and 13) similar to as previously described. The resilient portion 206 also includes ports 140 and feature appropriate buttons or actuators 130.

The bumpers 180 and 182 of the resilient portion 206 of the case 10 are illustrated. The opening 140 and feature appropriate buttons 130 are also shown. The open section 218 of the side 184 of the hard portion 204 is illustrated as well as the side 184 of the hard portion 204. An opposite sidewall 192 in the hard portion 204 also is seen. An open portion to 218 in the resilient portion 30 is also shown. The resilient pads 212 are located in holes 188 and the hard portion 204 are also shown. The geometric shape 202 in the back wall 183 of the hard portion 204 is also illustrated as well as the honeycomb pattern 210. As mentioned above, in some embodiments. The polygons associated with the honeycomb pattern 210 are raised, in other embodiments the borders between the polygons in the honeycomb pattern 210 may be raised instead. As a result, the honeycomb pattern 210 can either be in a positive or negative relief configuration. The honeycomb structure 210 may provide additional, rigidity, strength or stiffness to the hard portion 204. As result, the honeycomb structure 210 may allow the hard portion 204 to be lighter.

The resilient portion 206 of the case to 10 may also include a resilient front lip 214. The resilient lip 214 extends around the circumference of the open section 186 in the case 10. The open section 186 permits a screen associated with electronic device 20 (not shown in FIGS. 11-13) to be seen, and, in the case of a touchscreen, manipulated through the case 10.

Figure 15:
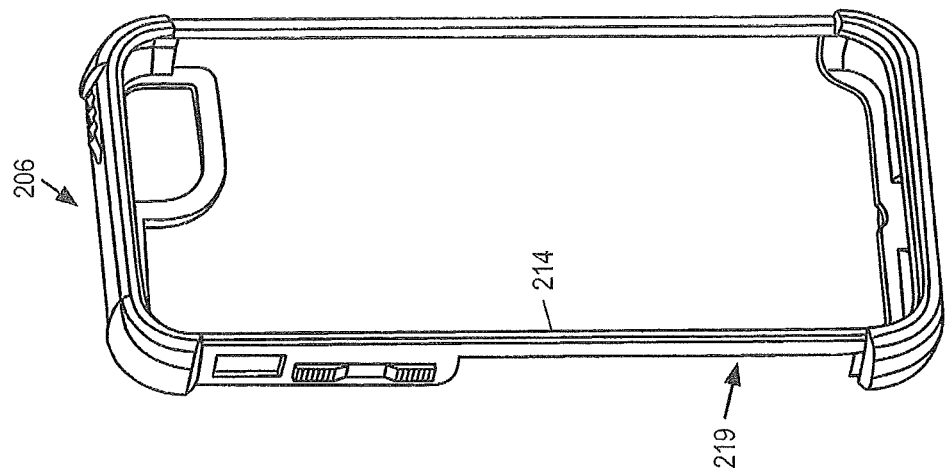
FIG. 15 is a front, isometric view of a portion of a case according to an embodiment.
Figure 14:
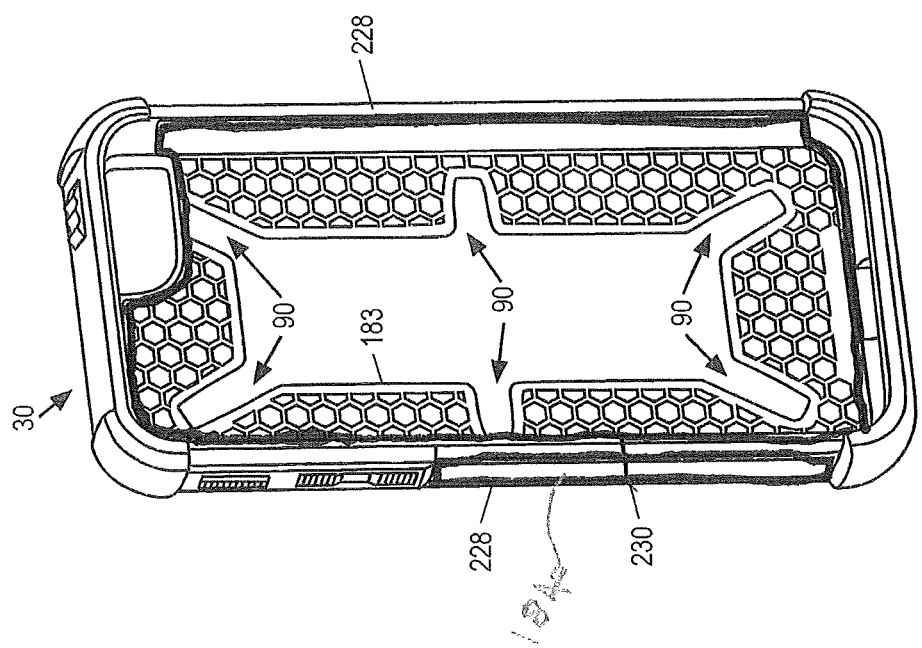
FIG. 14 is a front, isometric view of a portion of a case according to an embodiment.

FIGS. 14 and 15 are side-by-side comparison isometric views of the resilient portion 30 (FIG. 14) of one embodiments and the resilient portion 206 of a second embodiment (FIG. 15) where the hard case 40 and 204 are not shown. The resilient portion 206 of FIG. 15 lacks the back wall 183 of the resilient portion 30 shown in FIG. 14. Because there is no back wall 183 in FIG. 15, the honeycomb pattern 210 is also absent as well as the appropriate mating geometry 90. The side wall 184 shown in FIG. 14 is also absent in the embodiment shown in FIG. 15 having only a cutout portion 219 and the resilient front lip to 214 present in the embodiment shown in FIG. 15.

The resilient portion 206 shown in FIG. 15 is been trimmed down in order to take advantage of the aesthetic appeal and technical advantages provided by a hard plastic case 204 (not shown in FIG. 15). Other alterations of the resilient portion 206 may also be made in accordance with various embodiments.

Lines 228 and 230 of FIG. 14 show portions of the resilient case 30 in FIG. 14 and are removed in the resilient portion 206 of FIG. 15.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A composite case for an electronic device, the composite case comprising:
   a resilient component comprising:
     a top wall;
     a bottom wall;
     two parallel sidewalls; and
     a back wall that is contiguous with the top wall, the bottom wall, and the two sidewalls, wherein the back wall comprises a mating aperture that is more than half of the back wall; and
   a rigid component comprising:
     two parallel sidewalls; and
     a mating feature configured to interface with the mating aperture of the back wall of the resilient component such that the resilient component and the rigid component engage with one another to form an inside surface of the composite case, wherein the inside surface of the composite case is collectively formed by the back wall of the resilient component and the mating feature of the rigid component.

2. The composite case of claim 1, wherein the rigid component defines a honeycomb pattern.

3. The composite case of claim 1, wherein holes defined by the rigid component are filled with resilient material.

4. The composite case of claim 1, further comprising a sidewall comprised partially of one of the two sidewalls of the rigid component and one of the two sidewalls of the resilient component.

5. The composite case of claim 4, further comprising actuators defined by the resilient component of the sidewall dimensioned to align with actuators of the electronic device when the electronic device is housed in an orientation with a back portion of the electronic device adjacent to a portion of the inside surface of the composite case.

6. The composite case of claim 1, wherein the mating feature of the rigid component is raised toward the electronic device when the electronic device is housed in an orientation with a back portion of the electronic device adjacent to a portion of the inside surface of the composite case.

7. The composite case of claim 6, wherein the mating feature is generally rectangular with lines radiating from corners of the rectangle and a center portion of the rectangle.

8. The composite case of claim 1, wherein both the rigid component and the resilient component define an open region that is aligned with a lens associated with a camera of the electronic device when the electronic device is housed in an orientation with a back portion of the electronic device adjacent to a portion of the inside surface of the composite case.

9. The composite case of claim 8, wherein the resilient component further comprises a resilient border surrounding the open region.

10. The composite case of claim 1, wherein the rigid component is substantially at least one of: transparent and translucent.

11. The composite case of claim 1, wherein the resilient component has peripheral structure but substantially no front or rear structure.

12. The composite case of claim 1, wherein the rigid component and the resilient component are dimensioned so that the resilient component is flexed when it is engaged with the rigid component.

13. The composite case of claim 1, further defining an opening configured to provide access to an electronic port.

14. The composite case of claim 1, wherein the rigid component is made of a plastic material.

15. A method of protecting an electronic device, the method comprising:
attaching a rigid material to a resilient material; and
dimensioning both the rigid material and the resilient material to form a composite case;
wherein the resilient material of the composite case forms:
a top wall;
a bottom wall;
two parallel sidewalls; and
a back wall that is contiguous with the top wall, the bottom wall, and the two sidewalls, wherein the back wall comprises a mating aperture; and
wherein the rigid material of the composite case forms:
two parallel sidewalls; and
a surface having a mating feature configured to interface with the mating aperture of the back wall of the resilient material such that the resilient material and the rigid material form an inside surface of the composite case, with the mating feature being more than half of the inside surface of the composite case, wherein the inside surface of the composite case is collectively formed by the back wall of the resilient material and the mating feature of the rigid material.

16. The method of claim 14, further comprising providing a honeycomb structure in the rigid material.

17. The method of claim 14, wherein the rigid material is substantially at least one of: translucent and transparent.

18. The method of claim 15, wherein dimensioning both the rigid material and the resilient material further comprises defining at least one opening configured to align with at least one port of the electronic device.

19. The method of claim 15, wherein dimensioning both the rigid material and the resilient material further comprises forming the mating feature having a substantially rectangular shape with linear appendages radiating out from corners of the rectangle and from a center portion of the rectangle.

20. A composite case for an electronic device, the composite case comprising:
a resilient portion dimensioned to cover two end portions of the electronic device and less than half of a back portion of the electronic device when the electronic device is housed in an orientation with the back portion of the electronic device adjacent to a portion of an inside surface of the composite case; and
a rigid portion dimensioned to fit with the resilient portion and to provide a cover for at least part of the back portion of the electronic device when the electronic device is housed in the orientation with the back portion of the electronic device adjacent to the portion of the inside surface of the composite case, wherein:
a region in the rigid portion defines honeycomb shapes;
a region of the rigid portion that is raised toward the electronic device contained by the case is generally rectangular with lines radiating from corners of the rectangle and a center portion of the rectangle.

* * * * *